US 7,124,253 B1

United States Patent
Wright

(10) Patent No.: US 7,124,253 B1
(45) Date of Patent: Oct. 17, 2006

(54) SUPPORTING DIRECTORY-BASED CACHE COHERENCE IN AN OBJECT-ADDRESSED MEMORY HIERARCHY

(75) Inventor: Gregory M. Wright, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 381 days.

(21) Appl. No.: 10/782,147

(22) Filed: Feb. 18, 2004

(51) Int. Cl.
*G06F 12/00* (2006.01)

(52) U.S. Cl. .................................. 711/141; 711/202
(58) Field of Classification Search ................ 711/113, 711/118, 141, 202–203, 205–207
See application file for complete search history.

(56) References Cited

U.S. PATENT DOCUMENTS 6,154,811 A * 11/2000 Srbljic et al. ............... 711/118
6,654,866 B1 * 11/2003 Hagersten et al. .......... 711/205
6,859,868 B1 * 2/2005 Wright et al. ............... 711/207

* cited by examiner

*Primary Examiner*—Nasser Moazzami
(74) *Attorney, Agent, or Firm*—Park, Vaughan & Fleming, LLP

(57) ABSTRACT

One embodiment of the present invention provides a system that supports directory-based cache coherence in an object-addressed memory hierarchy in a computer system. During operation, the system receives a cache-coherence transaction for a cache line. If the cache line is an object-addressed cache line, the system uses a corresponding object identifier and offset to look up directory information specifying where copies of the object-addressed cache line are located in the caches in the computer system. Next, the system uses the directory information to perform the cache-coherence transaction.

25 Claims, 4 Drawing Sheets

SUPPORTING DIRECTORY-BASED CACHE COHERENCE IN AN OBJECT-ADDRESSED MEMORY HIERARCHY

BACKGROUND

1. Field of the Invention

The present invention relates to the design of computer systems that support references to objects defined within an object-oriented programming system. More specifically, the present invention relates to a method and an apparatus for supporting directory-based cache coherence in an object-addressed memory hierarchy.

2. Related Art

As object-oriented programming languages become more widely used, computer systems are being designed to manipulate objects more efficiently. In particular, some proposed object-addressed memory hierarchies include object-addressed caches that facilitate lookups based on location-independent object identifiers (OIDs) without having to first translate the OIDs into corresponding physical addresses.

Some object-addressed caches allow physically-addressed cache lines to coexist with object-addressed cache lines. This can be accomplished by encoding object addresses so that they fall within unused portions of the physical address space.

However, these object-addressed caches can complicate the design of cache-coherence mechanisms. The encoding of object addresses into the physical address space works well as a basis for coherence in broadcast bus-based systems. In these systems, a translator can intercept these object addresses before they reach physical memory. Note that there is no corresponding physical memory location for encoded object addresses.

In contrast, a system that uses a directory-based cache coherence mechanism operates differently. In these systems, a memory controller typically stores meta-information, such as the location of the cache line's current owner, alongside the contents of the physical cache lines. This meta-information can be used during the coherence protocol. For example, it can be used to forward a read request to whichever cache is the current owner of the cache line. Essentially, the memory is consulted before the system determines that the request cannot be satisfied from another cache. This presents a problem for object-addressed memory systems because object cache lines have no associated memory location in which to store the directory information.

Hence, what is needed is a method and an apparatus that provides support for directory-based cache coherence in an object-addressed memory hierarchy.

SUMMARY

One embodiment of the present invention provides a system that supports directory-based cache coherence in an object-addressed memory hierarchy in a computer system. During operation, the system receives a cache-coherence transaction for a cache line. If the cache line is an object-addressed cache line, the system uses a corresponding object identifier and offset to look up directory information specifying where copies of the object-addressed cache line are located in the caches in the computer system. Next, the system uses the directory information to perform the cache-coherence transaction.

In a variation on this embodiment, if the cache line is a physically-addressed cache line, the system uses a corresponding physical address to look up directory information specifying where copies of the physically-addressed cache line are located in the caches.

In a variation on this embodiment, the cache-coherence transaction is received by a memory controller that resides between main memory and caches in the computer system.

In a variation on this embodiment, looking up the directory information involves looking up the directory information in main memory.

In a variation on this embodiment, directory information for a physically-addressed cache line is located alongside a corresponding physical cache line in main memory. Furthermore, directory information for multiple object-addressed cache lines can be stored in a single physical cache line in main memory.

In a variation on this embodiment, when directory information for a given cache line is replaced by directory information for another cache line, or is otherwise removed, the system flushes and/or invalidates any copies of the given cache line that are located in caches in the computer system.

In a variation on this embodiment, using the corresponding object identifier and offset to look up the directory information in memory involves performing a hash lookup.

In a variation on this embodiment, the memory controller includes a translator that translates between object identifiers (used to reference objects in an object cache) and physical addresses (used to address objects in main memory).

In a variation on this embodiment, prior to receiving a request to access an object at the translator, the request is initially directed to the object cache. If the request causes a hit in the object cache, the object is accessed in the object cache and the request is not sent to the translator. Otherwise, if the request causes a miss in the object cache, the request is sent to the translator.

In a variation on this embodiment, the cache-coherence transaction can involve: a store to the cache line; a load from the cache line; an invalidation of the cache line; or any other change in a cache-coherence-related state of the cache line.

In a variation on this embodiment, the caches include one or more levels of caches.

In a variation on this embodiment, object-addressed cache lines are used to store objects defined within an object-oriented programming system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer System

Figure 1:
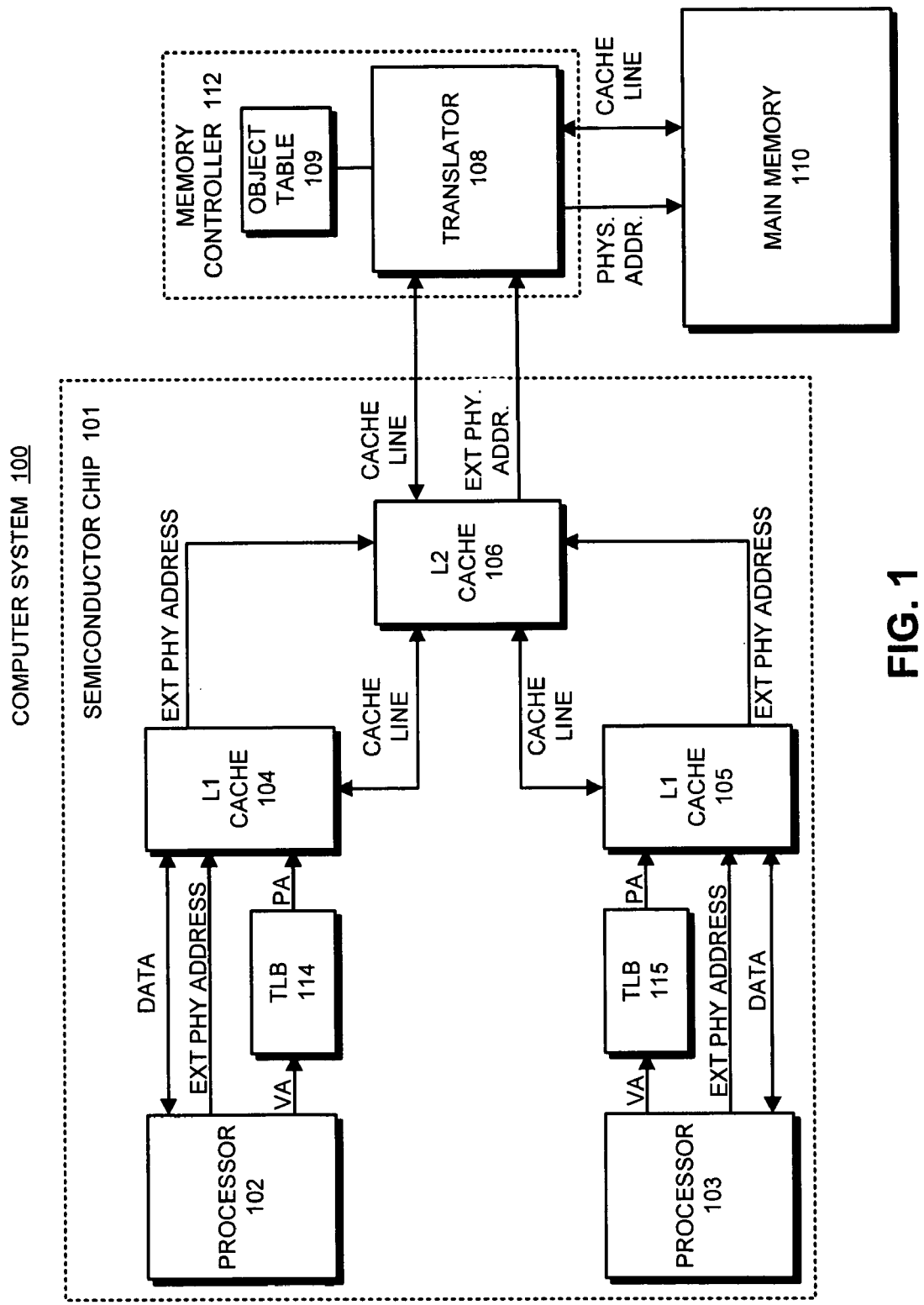
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 1, computer system 100 includes processors 102 and 103 within semiconductor chip 101. Processors 102 and 103 access code and data from L1 caches 104 and 105, respectively. Note that L1 caches 104 and 105 can include unified instruction/data caches, or alternatively, separate instruction caches and data caches.

Processors 102 and 103 are associated with translation lookaside buffers (TLBs) 114 and 115, which facilitate translating virtual addresses into physical addresses for non-object references.

L1 cache 104 and L1 cache 105 make use of an extended address encoding procedure that enables L1 cache 104 to function as both a conventional cache and an object cache. For example, during a conventional load operation, a virtual address is sent from processor 102 to TLB 114. TLB 114 translates the virtual address into a physical address, which is subsequently used by L1 cache 104.

In contrast, during a load operation involving a portion of an object, processor 102 obtains the corresponding object ID (OID) and offset and combines them to create an object address. This object address is embedded into an unused portion of the physical address space to produce an encoded address. Note that the higher order bits of this encoded address are typically different than the higher order bits of any physical address. This allows the system to distinguish an encoded address from a physical address. When the encoded address is subsequently sent from processor 102 to L1 cache 104, the encoded address bypasses TLB 114 and directly enters L1 cache 104. Note that only minor modifications are required to conventional cache designs in order to provide object caching using the above-described technique.

In order to request a non-object data item, such as a value from a normal virtual address, processor 102 generates a virtual address that is sent to TLB 114. TLB 114 translates this virtual address into a physical address, which is sent to L1 cache 104.

Note that after an object address is translated into an encoded address L1 cache 104, L1 cache 105 and L2 cache 106 can treat the encoded address in the same manner as a normal physical address.

If a given data item (or instruction) is not located within L1 cache 104 or L1 cache 105, it is retrieved from L2 cache 106. If it is not located within L2 cache 106, it is pulled into L2 cache 106 from main memory 110.

Unlike in a conventional memory hierarchy, a translator 108 is interposed between L2 cache 106 and main memory 110. Translator 108 converts an object address, comprising an object ID and an offset, into a corresponding physical address, which is sent to main memory 110.

If an object is not present within L2 cache 106, the encoded address is forwarded to translator 108. Translator 108 uses an object table 109 to translate the encoded address into a corresponding physical address. Each entry in object table 109 associates a given object ID with a corresponding physical address in main memory where the object resides. In one embodiment of the present invention, object table 109 is implemented as a table that resides in main memory 110.

When a cache miss for an object occurs in L2 cache 106, translator 108 intercepts the encoded address and extracts the object ID. Next, translator 108 uses the object ID to index into the object table 109 for a corresponding physical address. Once the physical address is found, translator 108 converts the load request for the object into a load request for a physical address in main memory 110.

The system uses the physical address and the offset to locate a specific cache line (or cache lines) in main memory 110. Fetching circuitry within translator 108 issues a load request to main memory 110. This fetching circuitry subsequently receives the cache line corresponding to the physical address. The fetching circuitry then forwards the cache line to L2 cache 106.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes typically starts at a physical address that is a multiple of 64. Objects, however, may start on any physical address which is a multiple of four in a 32-bit system. Thus, a 64-byte object cache line starting at address 44 includes addresses (44 . . . 107). This overlaps with physical cache lines (0 . . . 63) and (64 . . . 127). In this case, the object is split across two physical cache lines. Hence, two memory read operations are required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 106, translator 108 converts the encoded address containing the object ID and the offset into a physical address. The fetching circuitry subsequently uses the physical address to generate a store operation to store the evicted cache line in main memory 110. Note that during the process of evicting an object line, the system may have to perform read-modify-write operations on two physical cache lines.

Note that processors 102 and 103 are configured to handle the extended address encoding procedure described above. In one embodiment of the present invention, a platform-independent virtual machine, such as a JAVA VIRTUAL MACHINE, is modified to generate requests for portions of an object using an object ID and an offset. Moreover, in one embodiment of the present invention, processors 102 and 103 are configured to execute special instructions for performing load and store operations involving an object ID and an offset—in addition to normal load and store instructions that use virtual addresses.

Although the present invention is described with reference to a computer system 100 with two levels of cache, the present invention can generally be used with any single-level or multi-level caching structure. Furthermore, although computer system 100 as illustrated in FIG. 1 includes two processors, the present invention applies to computer systems with any number of processors.

Coherence Mechanism

Figure 2:
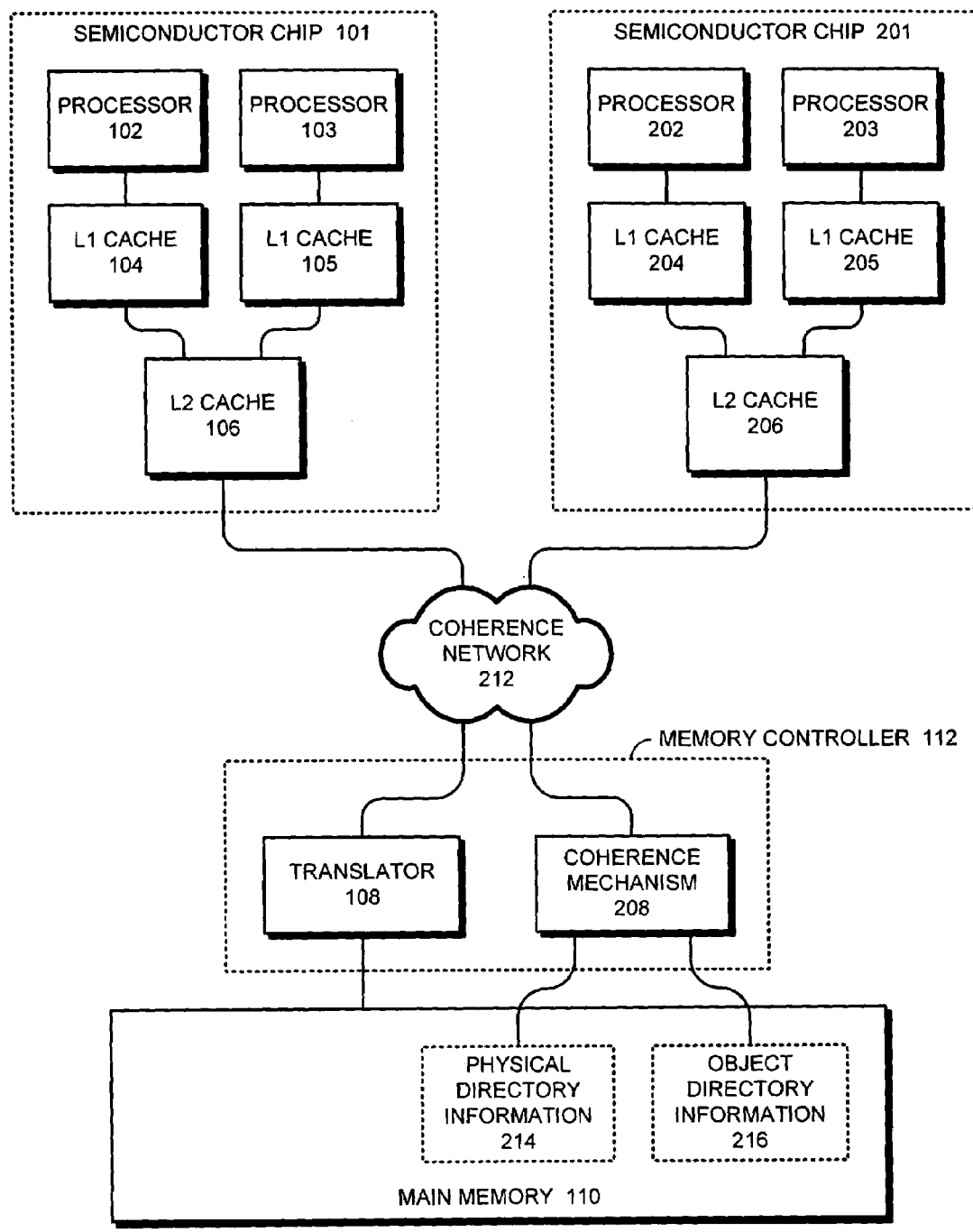
FIG. 2 illustrates a directory-based coherence mechanism within a computer system in accordance with an embodiment of the present invention.

FIG. 2 illustrates a directory-based coherence mechanism within a computer system in accordance with an embodiment of the present invention. The computer system illustrated in FIG. 2 is the same as the computer system illustrated in FIG. 1, except that it includes another semiconductor chip 201, which contains two additional processors 202–203, along with associated L1 caches 204–205 and L2 cache 206. L2 cache 206 is coupled to coherence network 212, which is also coupled to memory controller 112, and to L2 cache 106 on semiconductor chip 101.

Coherence network 212 is part of a directory-based cache-coherence system that maintains coherence between copies of cache lines in L1 caches 104–105, L2 cache 106, L1 caches 204–205, L2 cache 206 and main memory 110. In doing so, coherence network 212 operates in concert with coherence mechanism 208 in memory controller 112 to perform coherence transactions.

Figure 4A:
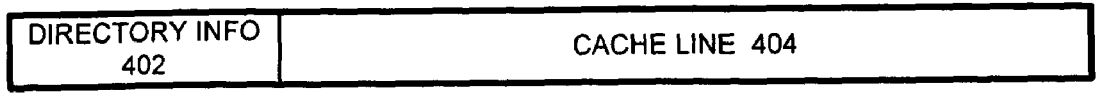
FIG. 4A illustrates how directory information can be stored along with a conventional physical cache line in main memory.

While performing coherence transactions, coherence mechanism 208 accesses directory information from main memory 110. More specifically, coherence mechanism 208 accesses physical directory information 214 in main memory 110, which specifies where copies of physically-addressed cache lines are located in the above-listed caches. In one embodiment of the present invention, directory information 402 for a specific physically-addressed cache line can be stored alongside the cache line 404 in main memory 110 (see FIG. 4A).

Referring back to FIG. 2, coherence mechanism 208 also accesses object directory information 216 in main memory 110, which specifies where copies of object-addressed cache lines are located in the above-listed caches.

Object directory information 216 can be stored as an array or a hash table, wherein object identifiers and offsets are mapped the entries. Note that directory information need only be maintained for object cache lines that are present in one of the computer system's caches. As such, the size of the table can be bounded based on the maximum amount of cache memory in the system. Furthermore, the associativity of the table can be bounded by the associativities of the caches and the number of caches.

Figure 4B:
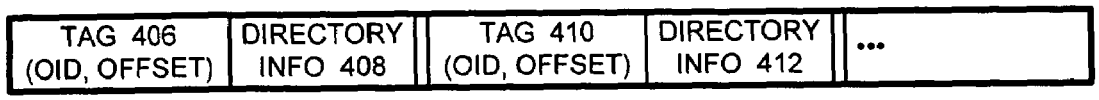
FIG. 4B illustrates how directory information can be stored for object-addressed cache lines in main memory in accordance with an embodiment of the present invention.

As is illustrated in FIG. 4B, in one embodiment of the present invention, directory information for multiple object-addressed cache lines can be stored in the same physical cache line. More specifically, tag 406, containing an object identifier and offset for a first cache line, is stored with corresponding directory information 408 for the first cache line. Similarly, tag 410, containing an object identifier and offset for a second cache line, is stored with corresponding directory information 412 for the second cache line.

Note that the fact that data need not be stored for object cache lines makes it possible to store several object directory entries in the same cache line. This makes it possible to implement a hash table structure, wherein entries in the same hash bucket fall into the same physical cache line. This facilitates performing a hash lookup without requiring multiple memory accesses to follow pointers within a hash bucket.

Processing a Coherence Transaction

Figure 3:
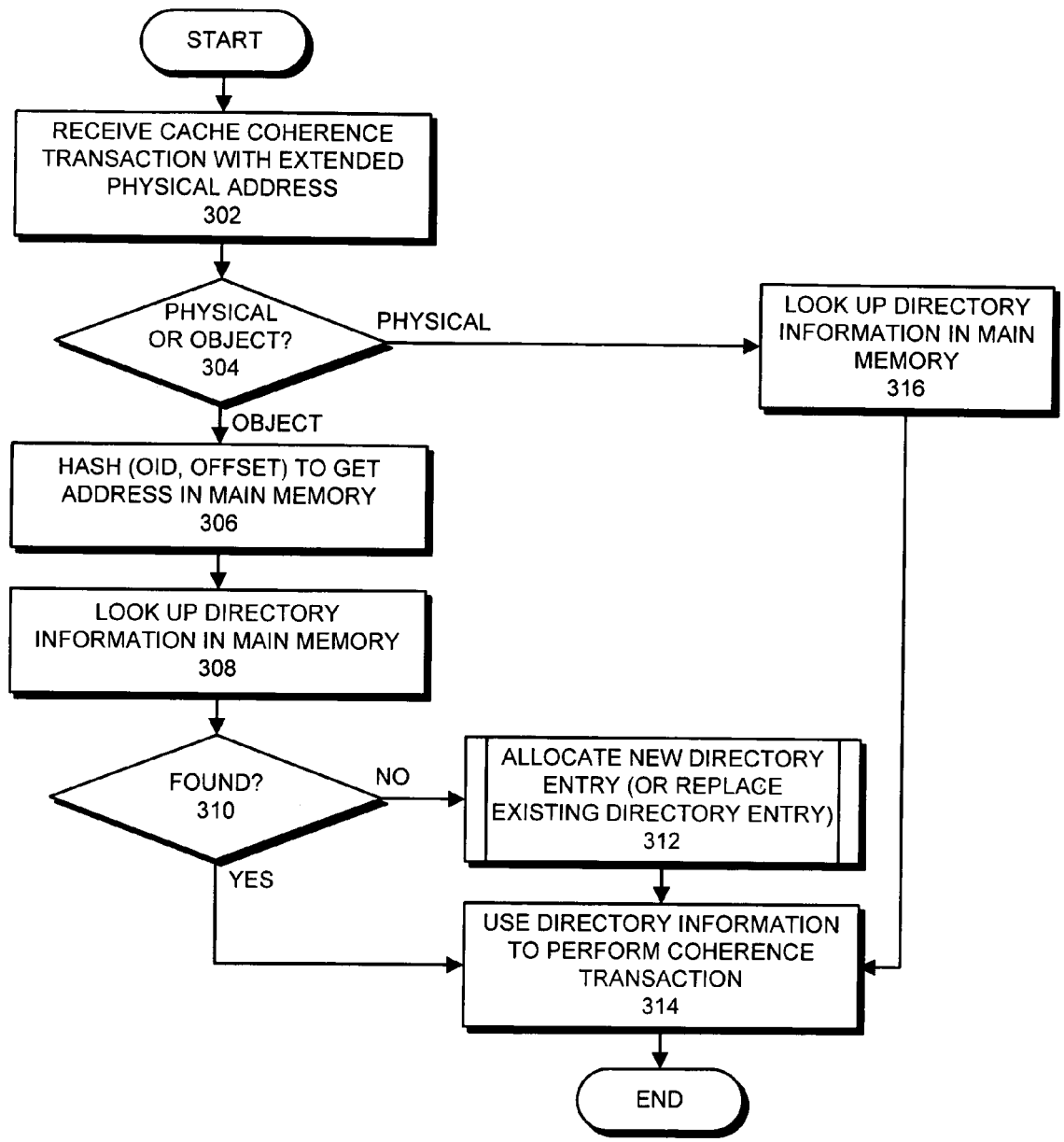
FIG. 3 presents a flow chart illustrating how a coherence transaction is processed in accordance with an embodiment of the present invention.

FIG. 3 presents a flow chart illustrating how a coherence transaction is processed in accordance with an embodiment of the present invention. During operation, coherence mechanism 208 within memory controller 112 receives a coherence transaction, which includes an extended physical address. Recall that this extended physical address can either be a physical address or an object identifier and corresponding object offset (step 302). Note that this coherence transaction can include any type of memory operation and/or related cache-coherence signal. For example, a coherence transaction can include: a store to a cache line; a load from a cache line; an invalidation of a cache line; or any other change in a cache-coherence-related state of a cache line.

Next, the system examines the extended physical address to determine whether the associated cache line is a physically-addressed cache line or an object-addressed cache line (step 304).

If the associated cache line is an object-addressed cache line, coherence mechanism 208 evaluates a hash function on the object identifier and offset to produce a corresponding address in main memory 110 (step 306). Next, the system uses the address lookup an entry containing directory information for the cache line in main memory 110 (step 308).

If the entry is found, the system uses the directory information to perform the coherence transaction (step 314). For example, if the coherence transaction is an invalidation of a given cache line, the system can use the directory information to send invalidation signals to all copies of the given cache line.

Otherwise, if the entry for the object addressed cache line is not found in main memory 110, the system creates a directory entry for the cache line (step 312). This can involve allocating a new directory entry or replacing an existing directory entry (step 312). The system then proceeds to step 314, where it uses the directory information to perform the coherence transaction.

If at step 304, the extended physical address indicates the associated cache line is a physically-addressed cache line, the system uses the extended physical address to look up directory information for the cache line in main memory 110 (step 316). Next, the system proceeds to step 314, where it uses the directory information to perform the coherence transaction.

Replacing a Directory Entry

Figure 5:
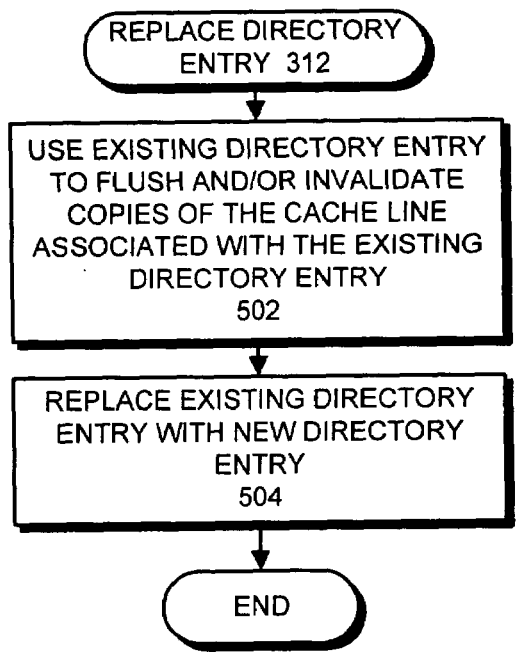
FIG. 5 presents a flow chart illustrating the process of replacing a directory entry in accordance with an embodiment of the present invention.

FIG. 5 presents a flow chart illustrating the process of replacing a directory entry in accordance with an embodiment of the present invention. In many cases, an existing directory entry has to be replaced to make room for a new directory entry. This might be caused for example, by a collision in a hash bucket for directory information. In order to perform the replacement, the system first uses directory information for the existing cache line to flush and/or invalidate all copies of the existing cache line that are located in caches in the computer system (step 502). Performing these invalidations ensures that any line in a cache has an associated directory entry. Next, the system replaces the existing directory entry with the new directory entry (step 504).

The foregoing descriptions of embodiments of the present invention have been presented only for purposes of illustration and description. They are not intended to be exhaustive or to limit the present invention to the forms disclosed.

Accordingly, many modifications and variations will be apparent to practitioners skilled in the art. Additionally, the above disclosure is not intended to limit the present invention. The scope of the present invention is defined by the appended claims.

What is claimed is:

1. A method for supporting directory-based cache coherence in an object-addressed memory hierarchy in a computer system, comprising:
   receiving a cache-coherence transaction for a cache line;
   if the cache line is an object-addressed cache line, using a corresponding object identifier and offset to look up directory information specifying where copies of the object-addressed cache line are located in the caches in the computer system; and
   using the directory information to perform the cache-coherence transaction.

2. The method of claim 1, wherein if the cache line is a physically-addressed cache line, the method further comprises using a corresponding physical address to look up directory information specifying where copies of the physically-addressed cache line are located in the caches.

3. The method of claim 1, wherein the method is performed by a memory controller that resides between main memory and caches in the computer system.

4. The method of claim 1, wherein looking up the directory information involves looking up the directory information in main memory.

5. The method of claim 1,
   wherein directory information for a physically-addressed cache line is located alongside a corresponding physical cache line in main memory; and
   wherein directory information for multiple object-addressed cache lines can be stored in a single physical cache line in main memory.

6. The method of claim 1, wherein when directory information for a given cache line is replaced by directory information for another cache line or is otherwise removed, the method further comprises flushing and/or invalidating any copies of the given cache line that are located in caches in the computer system.

7. The method of claim 1, wherein using the corresponding object identifier and offset to look up the directory information in memory involves performing a hash lookup.

8. The method of claim 1, wherein the memory controller includes a translator that translates between object identifiers (used to reference objects in an object cache) and physical addresses (used to address objects in main memory).

9. The method of claim 8,
   wherein prior to receiving a request to access an object at the translator, the request is initially directed to the object cache;
   wherein if the request causes a hit in the object cache, the object is accessed in the object cache and the request is not sent to the translator; and
   wherein if the request causes a miss in the object cache, the request is sent to the translator.

10. The method of claim 1, wherein the cache-coherence transaction can involve:
    a store to the cache line;
    a load from the cache line;
    an invalidation of the cache line; or
    any other change in a cache-coherence-related state of the cache line.

11. The method of claim 1, wherein the caches include one or more levels of caches.

12. The method of claim 1, wherein object-addressed cache lines are used to store objects defined within an object-oriented programming system.

13. An apparatus that supports directory-based cache coherence in an object-addressed memory hierarchy in a computer system, comprising:
    a receiving mechanism configured to receive a cache-coherence transaction for a cache line;
    a lookup mechanism, wherein if the cache line is an object-addressed cache line, the lookup mechanism is configured to use a corresponding object identifier and offset to look up directory information specifying where copies of the object-addressed cache line are located in the caches; and
    a cache-coherence mechanism configured to use the directory information to perform the cache-coherence transaction.

14. The apparatus of claim 13, wherein if the cache line is a physically-addressed cache line, the lookup mechanism is configured to use a corresponding physical address to look up directory information specifying where copies of the physically-addressed cache line are located in the caches.

15. The apparatus of claim 13, wherein the receiving mechanism, the lookup mechanism and the cache coherence mechanism are located within a memory controller that resides between main memory and caches in the computer system.

16. The apparatus of claim 13, wherein the lookup mechanism is configured to look up the directory information in main memory.

17. The apparatus of claim 13,
    wherein directory information for a physically-addressed cache line is located alongside a corresponding physical cache line in main memory; and
    wherein directory information for multiple object-addressed cache lines can be stored in a single physical cache line in main memory.

18. The apparatus of claim 13, further comprising an invalidation mechanism, wherein when directory information for a given cache line is replaced by directory information for another cache line or is otherwise removed, the invalidation mechanism is configured to flush and/or invalidate any copies of the given cache line that are located in caches in the computer system.

19. The apparatus of claim 13, wherein the lookup mechanism is configured to use the corresponding object identifier and offset to perform a hash lookup to obtain the directory information.

20. The apparatus of claim 13, wherein the memory controller includes a translator that translates between object identifiers (used to reference objects in an object cache) and physical addresses (used to address objects in main memory).

21. The apparatus of claim 20, further comprising an object cache;
    wherein the request is initially directed to the object cache;
    wherein if the request causes a hit in the object cache, the apparatus is configured to access the object in the object cache and is configured not to send the request to the translator; and
    wherein if the request causes a miss in the object cache, the apparatus is configured to send the request to the translator.

22. The apparatus of claim 13, wherein the cache-coherence transaction can involve:

a store to the cache line;

a load from the cache line;

an invalidation of the cache line; or any other change in a cache-coherence-related state of the cache line.

23. The apparatus of claim 13, wherein the caches include one or more levels of caches.

24. The apparatus of claim 13, wherein object-addressed cache lines are used to store objects defined within an object-oriented programming system.

25. A computer system that supports directory-based cache coherence in an object-addressed memory hierarchy, comprising:

one or more processors;

a set of caches coupled to the one or more processors;

a main memory;

a memory controller that couples together the set of caches and the main memory;

a receiving mechanism within the memory controller configured to receive a cache-coherence transaction for a cache line;

a lookup mechanism within the memory controller, wherein if the cache line is an object-addressed cache line, the lookup mechanism is configured to use a corresponding object identifier and offset to look up directory information specifying where copies of the object-addressed cache line are located in the caches, and wherein if the cache line is a physically-addressed cache line, the lookup mechanism is configured to use a corresponding physical address to look up directory information specifying where copies of the physically-addressed cache line are located in the caches; and a cache-coherence mechanism configured to use the directory information to perform the cache-coherence transaction.

* * * * *